No. 634,735. Patented Oct. 10, 1899.
G. F. LANE & S. COMEAU.
MACHINE FOR PICKING BERRIES.
(Application filed Nov. 12, 1898.)

(No Model.)

UNITED STATES PATENT OFFICE.

GEORGE F. LANE AND STEPHEN COMEAU, OF KINGSTON, MASSACHUSETTS.

MACHINE FOR PICKING BERRIES.

SPECIFICATION forming part of Letters Patent No. 634,735, dated October 10, 1899.

Application filed November 12, 1898. Serial No. 696,319. (No model.)

*To all whom it may concern:*

Be it known that we, GEORGE F. LANE and STEPHEN COMEAU, of Kingston, in the county of Plymouth and State of Massachusetts, have invented certain new and useful Improvements in Machines for Picking Berries, of which the following is a specification.

This invention has for its object to construct a machine for picking cranberries and the like; and it consists in a machine embodying in its construction rotating berry-detaching mechanism, whereby the fruit is detached from the plant without injury to the latter, and an intermittently-operated conveyer, whereby the detached berries are removed from the rotating berry-detaching mechanism and conveyed to a suitable receptacle adapted to receive them.

In the form of our invention hereinafter described a portable frame mounted upon wheels is provided to support the operative parts of the machine, and said frame is mounted on wheels and provided with means whereby it may be drawn or propelled and guided over a field of berries by hand or otherwise.

Upon the frame of the machine a rotatable drum is mounted, which is operatively connected with the wheels upon which the frame is mounted, or it may be operatively connected with one of the rotating axles to which the wheels are secured in such manner that when the machine is drawn over the ground the rotation of the wheels operates to impart rotary movement to the drum. Upon the outer surface of the drum one or more rows of berry-detaching hooks are provided, which rows extend longitudinally thereon, or substantially so, and said hooks serve to detach the berries from the plant as the machine is drawn over them. An intermittently-operated conveyer removes the berries from the drum and deposits them in a receptacle adapted to receive them.

Figure 1:
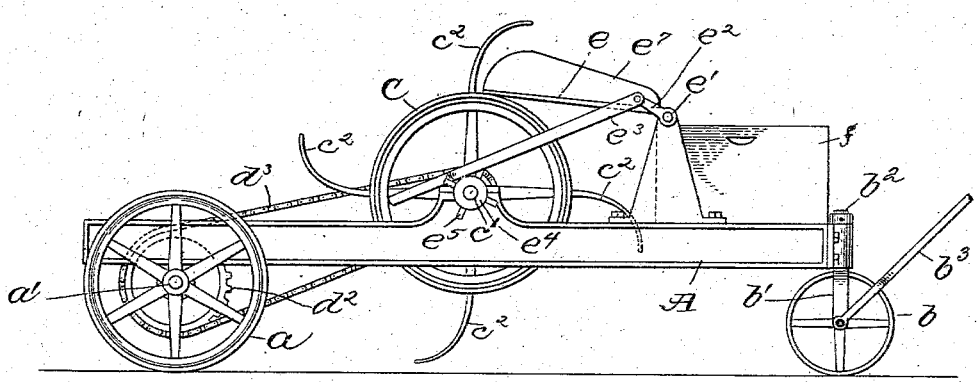
Figure 2:
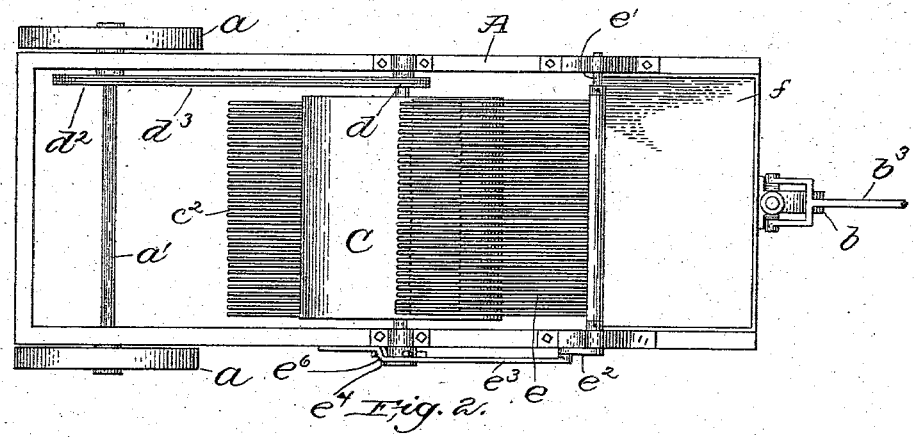

In the drawings, Figure 1 is a side elevation of a machine for picking cranberries embodying our invention. Fig. 2 is a plan view of Fig. 1.

A is the frame of the machine, which is supported at the rear upon wheels $a\ a$, fast to an axle $a'$, which is journaled in said frame, and said frame is herein shown as supported at its forward end by means of a wheel $b$, the axle of which is journaled in a fork $b'$, which is formed with a stem $b^2$, swiveled to said frame. To the fork $b'$ a handle $b^3$ or other suitable means may be attached, whereby the machine may be propelled.

Upon the frame A is mounted a drum C, which is fixed to a shaft $c'$, and said shaft has its journals in the frame A.

As a means for imparting rotary movement to the drum C when the machine is in operation a sprocket-wheel $d$ is herein shown as fixed to the shaft $c'$, which is connected with a sprocket-wheel $d^2$, fast on the axle $a'$, by means of a sprocket-chain $d^3$, so that as the axle $a'$ rotates rotary movement will be imparted to the drum C.

Upon the outer surface of the drum C are mounted berry-detaching hooks $c^2$, which are preferably arranged in rows extending longitudinally of said drum, four such rows being herein shown, and the hooks of each row are arranged a slight distance apart for the purposes hereinafter stated.

As the drum C rotates the hooks $c^2$ pass in between the sprigs and stems of the plant, detaching the berries therefrom, which will remain upon the upper side of the row of hooks as the latter rise.

For the purpose of removing the detached berries from the drum we provide an intermittently-operated conveyer, which removes the berries from the drum and deposits them in a suitable receptacle, and said conveyer is herein shown as consisting of a row of parallel bars $e$, which are secured at one end to a rock-shaft $e'$, journaled in the frame A of the machine, and the free ends of said bars rest upon the upper surface or periphery of the drum C. The bars $e$ are preferably arranged in an inclined plane tangent to the cylindrical surface of the drum C and so spaced and disposed with relation to the detaching-hooks $c^2$, carried by the drum C, as that said hooks will pass between the bars $e$ during the revolutions of the drum. The end bar of the row at each side of the machine is formed or provided with an upwardly-projecting plate $e^7$, which serves to prevent the berries from passing over the sides of the conveyer and to guide them toward the discharge end thereof.

As a means for intermittently operating the conveyer a lever $e^2$ is herein shown as fixed at one end to the rock-shaft $e'$ and pivotally connected at its opposite end to a bar $e^3$, and said bar $e^3$ rests at its lower end upon a hub $e^4$, fixed to the shaft $c'$. The hub $e^4$ is formed or provided with a number of projections $e^5$, which during the revolution of the shaft $c$ engage an offset portion $e^6$, formed in the bar $e^3$, and said projections operate through the medium of said bar $e^3$ and lever $e^2$ to rock the shaft $e'$, thereby moving the free ends of the bars $e$ of the conveyer upward, and as the projections $e^5$ move out of engagement with the bar $e^3$ the conveyer will be returned to its normal position by gravity. The conveyer is operated approximately at a time when the detaching-hooks $c^2$ reach their highest point, and the berries carried by said hooks are forced onto the conveyer, which latter when it is operated serves to deposit the same in a receptacle $f$, detachably mounted upon the frame A below the rock-shaft $e'$.

What we claim is—

1. A machine for picking cranberries, and the like, comprising a rotating drum, having berry-detaching hooks projecting therefrom, a conveyer for removing the berries from said drum, consisting of a number of parallel bars, pivotally supported at one end, and having their opposite ends resting on said drum, and arranged to permit the passage between them of the hooks carried by said drum, and means for intermittently operating said conveyer substantially, as and for the purpose, above described.

2. A machine for picking cranberries, and the like, comprising a frame mounted upon wheels, a rotatable drum mounted on said frame, operatively connected with the wheels, and having one or more rows of berry-detaching hooks projecting therefrom, a conveyer consisting of a number of parallel bars pivotally supported on said frame at one end, and having their opposite ends resting on said drum, and arranged to permit the passage between them of the hooks carried by said drum, means for intermittently moving said bars on their pivots, and a receptacle mounted on said frame located below the discharge end of said conveyer, substantially as, and for the purpose, above described.

GEO. F. LANE.
STEPHEN COMEAU.

Witnesses:
WILLIAM W. BREWSTER,
HENRY W. BARNES.